United States Patent Office 3,467,343
Patented Sept. 16, 1969

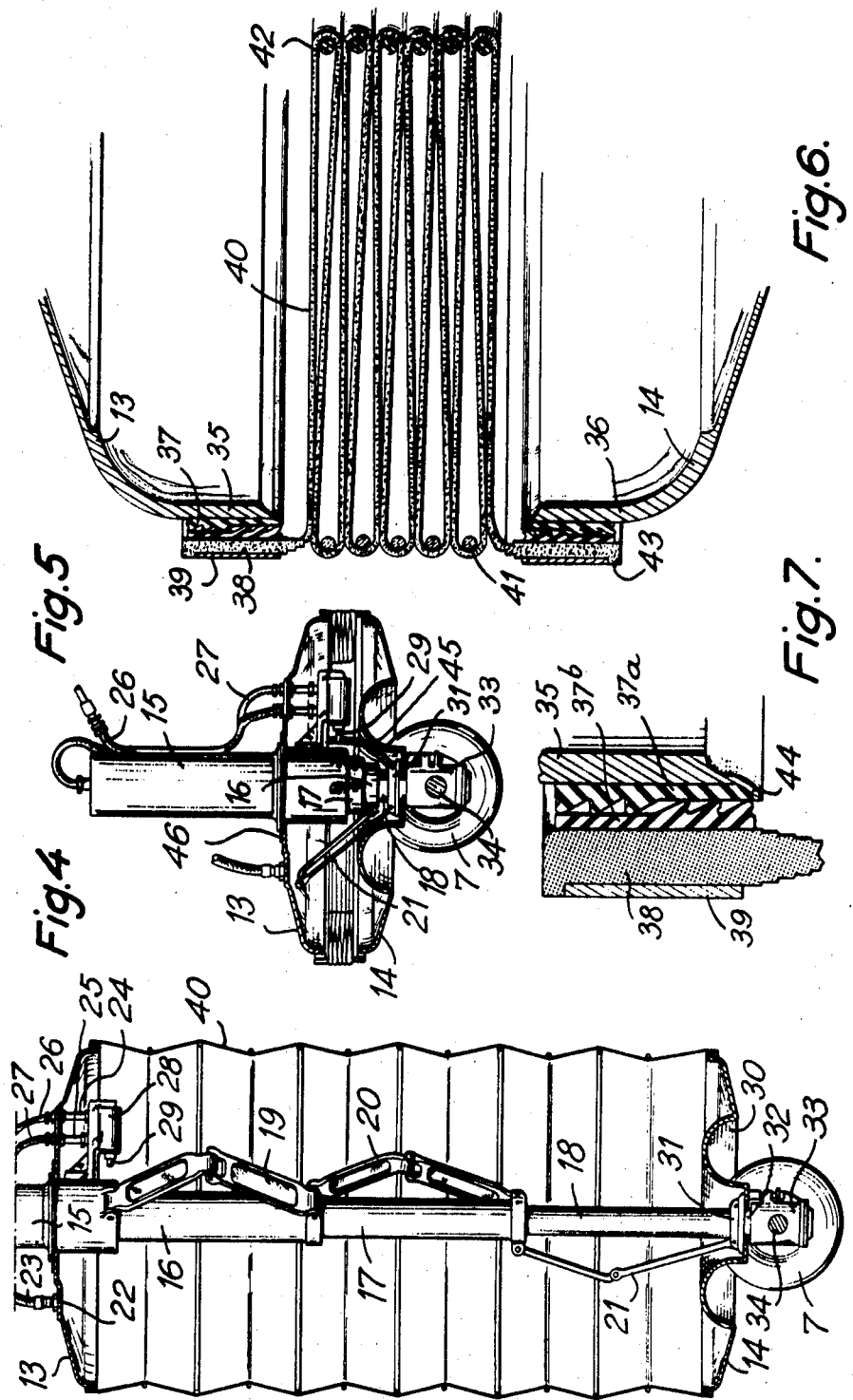

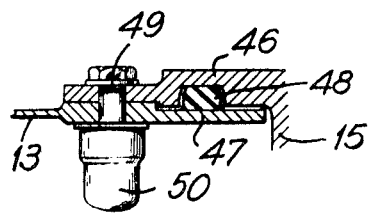
Fig. 8.
Fig. 9.
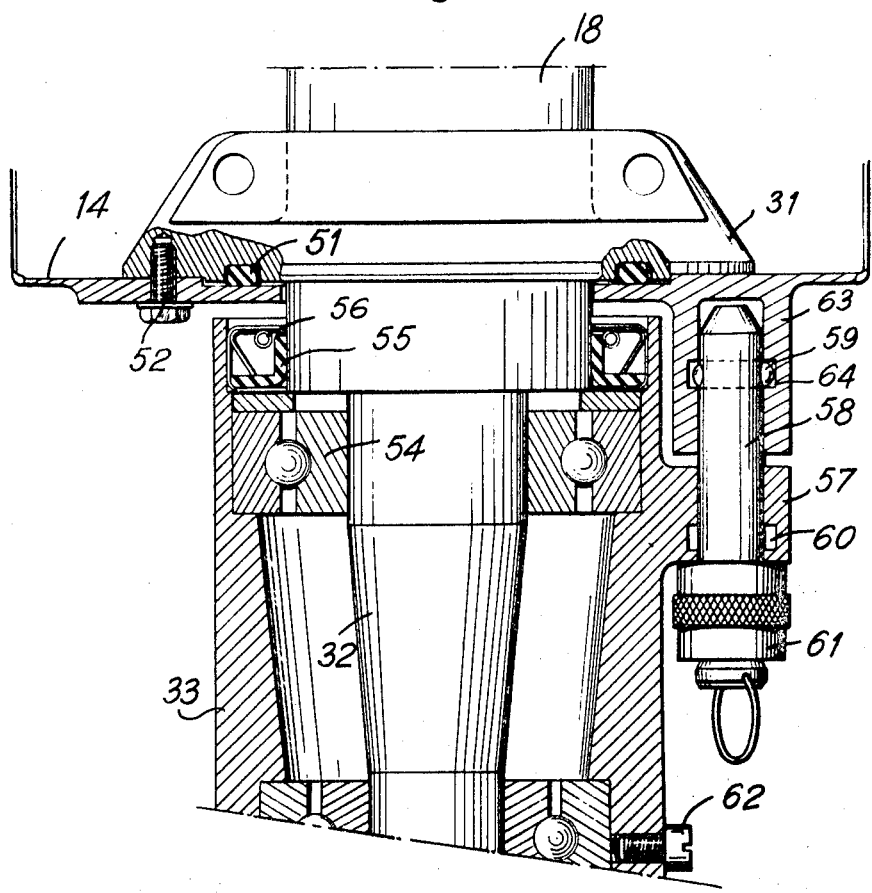

1

3,467,343
LANDING AND FLOAT GEAR FOR HELICOPTERS, ESPECIALLY LIGHT HELICOPTERS
Andre Violleau, Vitrolles, France, assignor to Sud-Aviation Societe Nationale de Construction Aeronautiques, Paris, France
Filed May 8, 1967, Ser. No. 636,887
Claims priority, application France, May 12, 1966, 61,328
Int. Cl. B64c 27/04, 25/56, 25/66
U.S. Cl. 244—17.17               8 Claims

ABSTRACT OF THE DISCLOSURE

A landing and float gear for helicopters comprises a plurality of vertical retractable floats each of which is formed of a substantially cylindrical envelope preferably made of flexible material, containing an axially disposed double-acting jack connected to a power-fluid source and communicating with a source of inflating air, the envelope being formed with rigid streamlined ends, the upper one of which is connected to the helicopter structure and the lower one equipped with unconcealed landing members such as wheels.

---

This invention relates to a device for enabling a helicopter and more particularly a light helicopter to land or to alight on water and float thereon, the transition from one capability to the other being selected by the pilot by merely operating a control.

With the aim of allowing a helicopter to float even on rough water, it has already been proposed to equip the machine with floats, which in most cases are horizontal. Replacing these conventional horizontal floats with floats having a vertical operative position results in improved stability, since the smaller the float cross-section at the water-line the smaller the thrust exerted by the waves. The use of vertical floats consequently improves stability even in a swell and enables the cabin of the helicopter to be kept above the waves, thereby facilitating sea rescue work for example.

One consequence of using floats is that the aerodynamic drag is increased, and for this reason it has been proposed to retract them in flight.

More particularly, in the case of horizontal floats, such retraction has been accomplished by utilizing floats which are deflated during flight and inflated prior to use.

The drag produced by vertical floats, which would normally be considerable, has been reduced by swivelling the floats into a horizontal position in flight, but such an arrangement requires means to swivel floats.

The present invention has for its object to overcome the disadvantages of prior art arrangements of this kind and to accordingly provide a helicopter landing and float gear comprising of a plurality of vertical retractable floats each of which consists of a substantially cylindrical envelope containing an axially disposed jack, which envelope is connectable to a source of inflating air for balancing the pressure of the surrounding water and has its upper end connected to the helicopter structure and its lower end fitted with landing members such as wheels.

An advantage of such an arrangement is its ease of fabrication and utilization. It is possible with this configuration to obtain fuller retraction and better streamlining. The transition from land configuration to marine configuration, or vice versa, can be readily accomplished by folding and unfolding the float envelopes.

The description which follows with reference to the accompanying non-limitative exemplary drawings will give a clear understanding of how the invention can be carried into practice.

In the drawings:

2

FIGURE 4 is a sectional view on an enlarged scale of one of the vertical floats in its unfolded position.

FIGURE 5 is a sectional view of the float of FIGURE 4 in its folded position.

FIGURE 6 shows in partial section on a still more enlarged scale the float in its folded position.

FIGURE 7 shows on a still more greatly enlarged scale the fluid-tight joint between the wall of the float and the cap forming one of the ends thereof.

FIGURE 8 is a detail view on a very greatly enlarged scale of the junction between a jack cylinder and an upper float end.

FIGURE 9 shows on a likewise greatly enlarged scale the junction of the lower cap and the terminal jack piston with the associated landing gear latching system.

Figure 1:
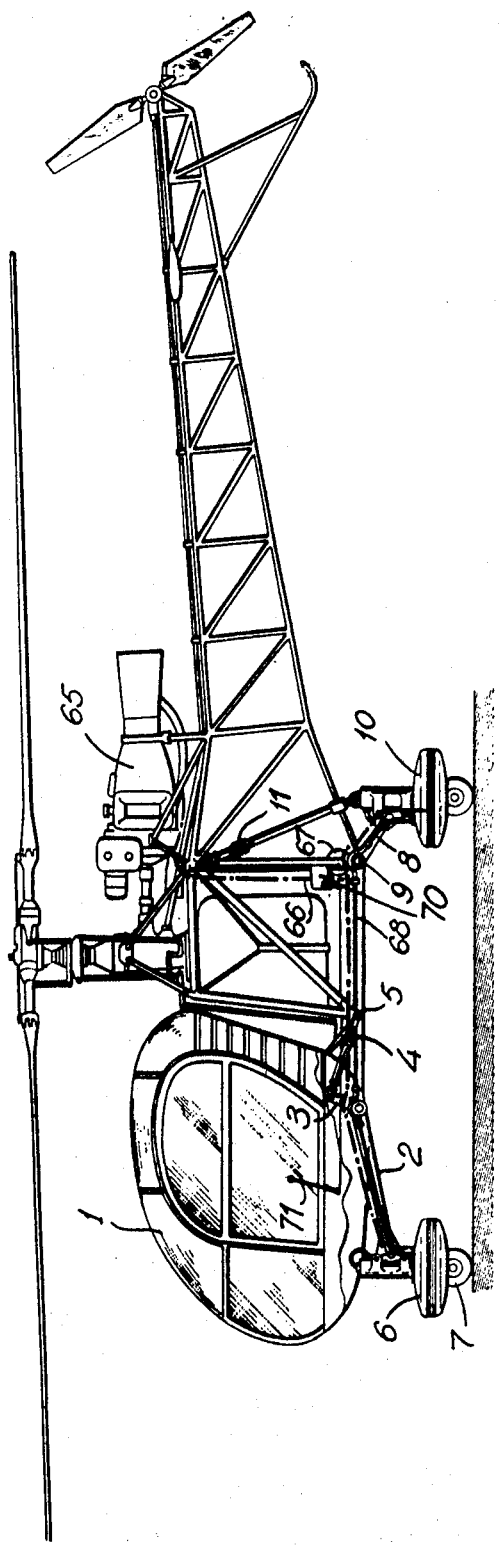
FIGURE 1 is a schematic profile view of a helicopter equipped with a landing and float gear as hereinbefore disclosed, in the configuration in which the helicopter is standing on firm ground.
Figure 2:
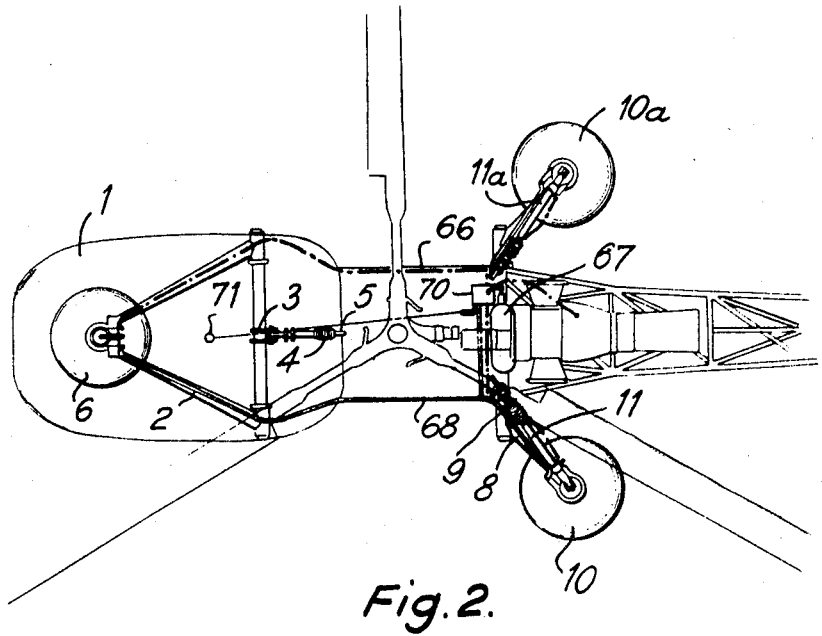
FIGURE 2 is a plan view of the system, the remainder of the helicopter being shown fragmentally in thin lines.
Figure 3:
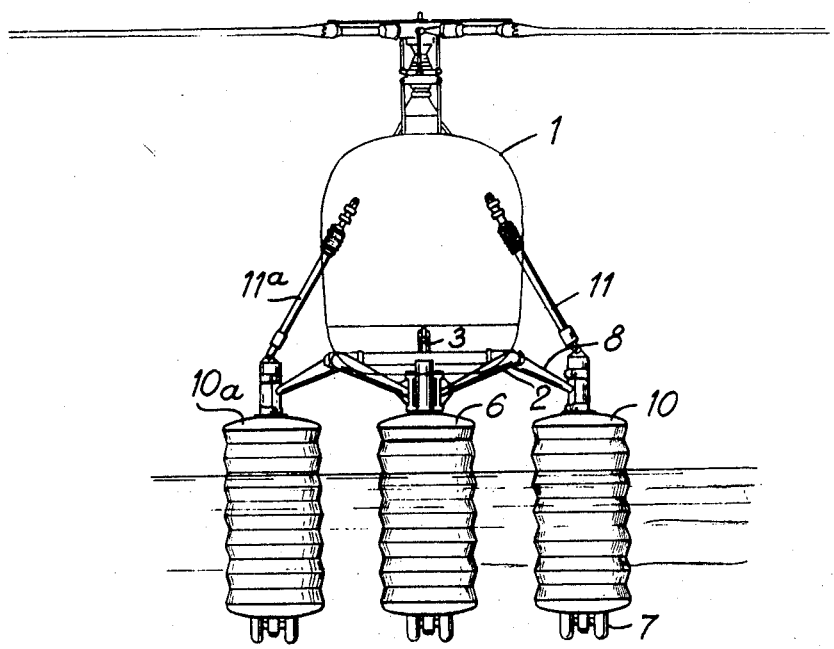
FIGURE 3 is a front view of the amphibious system according to the invention in its marine configuration, the remainder of the helicopter being shown fragmentally in thin lines.

Referring now to the drawings, the subject landing and float gear of the present invention is fixed to the structure of helicopter 1. The front structure of this system includes a V-shaped arm 2 articulated about an axis perpendicular to the longitudinal centerline of the helicopter on coaxial pivots located on either side of the cabin. Substantially in its middle, V-shaped arm 2 is fast with an axial arm 3 hingedly connected to a spring damper unit 4 which is in turn pivotally connected to the helicopter structure about a hinge axis parallel to said pivots.

Adjacent its apex, the V-shaped arm is connected through an associated jack cylinder to a front float 6 the lower end of which carries twin-wheels 7, as will be explained in greater detail hereinafter.

The rear structure of the gear according to the present invention includes two lower lateral arms 8 similarly connected to pivots 9 parallel to the aforesaid pivots and on to the ends of which are fixed retractable floats 10 and 10a, likewise through the medium of associated jack cylinders to which are pivotally connected upper dampers 11 and 11a, which dampers are in turn hingedly connected to upper securing points on the lattice structure of the helicopter.

The suspension and damping elements 4 and 11, 11a, are devised and adjusted so that when they are under load and bearing on a supporting surface the floats 6 and 10 have their axes substantially vertical.

Thus, irrespective of whether they are retracted or extended, the three float units form supporting points lying at the corners of an isosceles triangle and ensure both longitudinal and transverse stability of the helicopter when it rests on the ground or on water.

As is clearly shown in FIGURES 4 and 5, each float comprises an upper end 13 and a lower end 14 in the form of light-alloy caps. Upper cap 13 is connected to a jack cylinder 15 equipped with the attachments required for a rigid connection with the associated supporting arm 2 or 8. This jack is of the hydraulic telescopic variety with three double-acting pistons 16, 17 and 18 fully retractable into cylinder 15. Scissors linkage 19, 20 and 21 interconnect the pistons, and linkage 19 connects primary piston 16 with jack cylinder 15 whereby to maintain the pistons in their angular relationship to cylinder 15 and in order that the linkages should not hinder folding of the float, since they lie within the radial outline of the caps and the flexible envelope referred to hereinbelow.

The upper end 13 is fitted with a connection 22 to a compressed inflating air line 23, and also with two connections 24 and 25 to lines 26 and 27 for admitting actuating liquid to two-way actuator 28 whose piston-rod carries a latch 29 on its end.

The lower end 14 is formed with an annular groove 30 around its central region. This central region is leaktightly fast with a collar 31 which is rigid with the end of rod 18 and to which is pivotally connected linkage 21. A projecting stub 32 of rod 18 acts as a journal for a ball-bearing housing 33 through which extends a shaft 34 carrying twin-wheels 7, the whole of this arrangement being described in greater detail with reference to FIGURE 9. Annular groove 30 permits partial upward retraction of wheel 7 and combined pivoting thereof about the stub 32. The ends 13 and 14 are formed on their peripheries with cylindrical skirts 35 and 36 over which are fitted and bonded seals 37, over which seals are in turn fitted and bonded and clamped by a strap 39 the ends 38 of flexible tubular envelopes.

The air pouch forming tubular envelope 40 is devised in the fashion of a bellows and made of rubberized waterproof fabric well-known per se, as customarily used for manufacturing floats and as described for example in French Patents Nos. 1,156,413 and 1,157,007 granted to the applicant. The circular outer folds are strengthened internally by relatively rigid annular stiffeners 41 made of piano wire. The inner folds are set under tension by elastic rings 42 which, like said rigid annular stiffeners, are held in position by bonded fabric keepers.

The tubular envelope is fitted at each end 38 with an annular reinforcement 43 which provides the necessary portions in relief beneath straps 39 and against seals 37, which seals are each made up of two concentric elements 37a and 37b (FIGURE 7) of identical profile but inverse disposition and each having a smooth inner portion and a further portion formed with sucessive ridges thereon. The seal elements 37a and 37b are arranged with their ridged and smooth portions facing each other. The outer surfaces of such a composite seal bear respectively against the inside of the thickened envelope end 38 and against the skirt 35, being restrained against a terminal lip 44 on the skirt. The seal is preferably bonded to the skirt and the thickened end 38. Strap 39 can have any known convenient configuration and may have its adjacent ends joined by a tightening screw permitting of correctly and leaktightly squeezing the two-part seal 37a, 37b, which two parts are devised as described above so that leaktightness is achieved with a clamping force compatible with the structural lightness of the envelope ends 13 and 14.

Further, collar 31 is rigid with an offset lug 45 formed at its end with a hole adapted to receive a latch 29 which penetrates thereinto automatically when the jack rods 16, 17 and 18 have telescoped into their fully retracted position.

As FIGURE 8 clearly shows, a leakproof connection between jack cylinder 15 and end 13 is obtained by means of a collar 46 equipping said cylinder, which collar is applied against an internal reinforcement 47 on envelope end 13, at the periphery of the opening through which the terminal portion of the valve cylinder extends into the envelope end. An elastic O-ring 48 is positioned between the collar and the reinforcement, and the necessary tightening is effected by a set of screws 49 which screw into cap-nuts 50 positioned inside the envelope end and which leaktightly encase the screw ends and bear leaktightly against a rim portion of the envelope end.

Similarly, the leakproof joint between rod 18 and end 14 is obtained by means of an elastic O-ring 51 lodging in a groove on collar 31. Blind holes are formed in the body of collar 31 for receiving screws 52 screwed from the outside of the central reinforcement of envelope end 14.

The housing 33 is mounted over stub 32 with a ball-bearing 54 therebetween, leaktightness of the open end of the housing being provided by a seal 55, well-known per se, having flexible lips pressed respectively against the stub and the housing by a set of springs 56. The housing carries on its side a lug 57 through which extends a bolt 58. Bolt 58 is equipped with spring-loaded plungers 59 adapted to cooperate with a retaining groove 60 formed inside lug 57. A head 61 with a knurled portion thereon enables the bolt to be moved axially, while a screw 62 on the outside of housing 33 prevents accidental extraction of the bolt by acting as an abutment for head 61. On the reinforced portion of end 14 are provided one or more hollow bosses 63 located in chosen positions and the bores of which are formed with grooves 64 for receiving the plungers 59 of bolt 58 and for retaining the latter in its thrust-in position.

On the helicopter structure (see FIGURE 1) a powerplant 65 is fitted with a compressed air take-off from which is lead an air supply pipe 66 which splits into as many branches as there are floats, with each such branch forming one of the aforesaid lines 23 for inflating the envelopes 40. The helicopter structure furthermore supports an emergency compressed air bottle 67.

In addition, powerplant 65 comprises a hydraulic supply (not shown) capable of supplying feed rails 68 from which branch off lines associated with the jack cylinders 15 and the latch actuators 28.

Preferably, the feed system to actuators 28 and jack cylinders 15 is arranged in series in such manner that retraction of the jacks corresponds to extension of the latches 29, by contriving the kinematics of the latch ends and the latching lugs 45 so that automatic latching is effected upon full retraction of the jack rods and automatic releasing of the latch when the jacks are activated for extension thereof.

It goes without saying that the branches of the air or liquid pipes includes flexible sections adjacent the articulations of the float supports. The pipes themselves lead through a distributing slide-valve 70 which synchronizes the hydraulic and pneumatic intakes and enables the pilot to operate via a single lever 71 mounted on the floor of the cockpit and connected to slide-valve 70, as shown in FIGURE 1.

Although latching means are provided in the retracted position in the case of the constructional form described above, none are provided in the extended position since maintenance of the pressure in the jacks is sufficient to maintain the extended configuration.

The system hereinbefore described operates as follows:

In the landing position and in the normal flight position, the floats are retracted as shown in FIGURE 1. Maneuvering on the ground can be facilitated by releasing the bolts 58 so as to permit free castering of the wheels 7. In flight it is preferable to latch each set of wheels in a direction parallel to the fore-aft axis of the machine.

For marine missions, the jacks 15 are extended and the envelopes 40 inflated with compressed air to a pressure sufficient for them not to be crushed when they plunge into the water.

In an emergency, or in the event of a failure of the powerplant 65, bottle 67 may be used.

Obviously, an emergency manual hydraulic feed pump may be provided, and all the pipes lead up to distributor elements placed at the pilot's disposal to enable the various feed operations to be effected by means of a single control.

The various arrangements described above permit full retraction of the floats with satisfactory streamlining in normal flight, as well as easy and rapid transition from the marine mode to the land mode, and vice versa.

It goes without saying that changes and substitutions of parts may be made to the form of embodiment hereinbefore described. For example, although a three-float arrangement has been described, it will be manifest that a greater number of floats could be employed, especially if a heavier machine is involved.

What I claim is:

1. A landing and float gear for helicopters and particularly light helicopters, comprising a plurality of vertical retractable floats each formed of a substantially cylindrical envelope preferably made of flexible material, a double-acting jack positioned along the axis of each envelope, means for linking each jack to a source of power fluid and means for linking each envelope to a source of inflating air, streamlined upper and lower rigid ends in each envelope, means for securing said upper rigid end to the helicopter structure, and unconcealed landing members mounted on said lower rigid end.

2. A landing and float gear for helicopters, comprising a plurality of vertical retractable floats each formed of a substantially cylindrical envelope, a double-acting jack positioned along the axis of each envelope, means for linking each jack to a source of power fluid and means for linking each envelope to a source of inflating air, streamlined upper and lower rigid ends in each envelope, a jack cylinder extending through each upper rigid end, means for leaktightly connecting said upper end to said jack cylinder, an articulated arm elastically mounted on the helicopter structure, external attachments for said arm on said jack cylinder and unconcealed landing members mounted on said lower rigid end.

3. A landing and float gear for helicopters, comprising an axial front float and two lateral rear floats, a V-shaped arm restrained by a damper and supporting said axail float, and an independent lower arm and damper connected to each of said lateral floats, each float comprising a jack cylinder having multiple pistons telescoping thereinto and scissor linkages connecting said pistons to one another and to said jack cylinder for retaining said pistons in their mutual angular positions.

4. A landing and float gear for helicopters, comprising an axial front float and two lateral rear floats, a V-shaped arm restrained by a damper and supporting said axial float, and an independent lower arm and damper connected to each of said lateral floats, each float containing at least one automatically engageable latch for latching said lower end in a position adjacent said upper end at the end of the float retraction stroke.

5. A landing and float gear for helicopters and particularly light helicopters, comprising a plurality of vertical retractable floats each formed of a substantially cylindrical envelope made of flexible material, a double-acting jack positioned along the axis of each envelope, means for linking each jack to a source of power fluid and means for linking each envelope to a source of inflating air, streamlined upper and lower rigid ends in each envelope, means for securing said upper rigid end to the helicopter structure, and unconcealed landing members mounted on said lower rigid end, said lower rigid end comprising at least one wheel partly recessed and having at least one castoring position and a spring-loaded captive locking bolt for fixing the wheel in said castoring position.

6. A landing and float gear for helicopters, comprising a plurality of vertical retractable floats each formed of a substantially cylindrical envelope, a double-acting jack positioned along the axis of each envelope, streamlined rigid upper and lower ends in each envelope, means for securing said upper rigid ends to the helicopter structure and unconcealed landing members mounted on said lower rigid ends, the flexible float envelope extending between said ends in the fashion of bellows having its outer folds held firmly by stiffening rings and its inner folds tightened by elastic rings.

7. A landing and float gear for helicopters, comprising a plurality of vertical retractable floats each formed of a substantially cylindrical envelope, a double-acting jack positioned along the axis of each envelope, means for linking each jack to a source of hydraulic fluid, streamlined rigid upper and lower ends in each envelope, means for securing said rigid upper end to the helicopter structure and unconcealed landing members mounted on said rigid lower end, and clamping straps connected the flexible float envelope to each of said ends and a seal of great crushing resiliency interposed between said envelope and said ends.

8. A landing and float gear for helicopters, comprising a plurality of vertical retractable floats each formed of a substantially cylindrical envelope, a double-acting jack positioned along the axis of each envelope, a float inflation compressed air take-off on the helicopter powerplant and an emergency air bottle, a hydraulic fluid supply driven by said powerplant, and means for controlling the distribution of air and hydraulic fluid together with an emergency hydraulic pump at the pilot's disposal for permitting float extension at least, under all foreseeable circumstances.

References Cited

UNITED STATES PATENTS

| | | | |
|---|---|---|---|
| 2,621,874 | 12/1952 | Boyle | 244—101 |
| 2,984,437 | 5/1961 | Jensen et al. | 244—17.17 XR |
| 3,038,685 | 6/1962 | Hofmann | 244—17.17 |
| 3,243,149 | 3/1966 | Burns | 244—100 |
| 3,321,158 | 5/1967 | Di Stasi | 244—105 XR |

MILTON BUCHLER, Primary Examiner

PAUL E. SAUBERER, Assistant Examiner

U.S. Cl. X.R.

244—101, 105